United States Patent

[11] 3,571,929

[72] Inventor Norman J. Peters
 Fond du Lac, Wis.
[21] Appl. No. 741,709
[22] Filed July 1, 1968
[45] Patented Mar. 23, 1971
[73] Assignee DEC-International Inc.
 Madison, Wis.

[54] CURD MILL
 10 Claims, 7 Drawing Figs.

[52] U.S. Cl. .................................................. 31/48
[51] Int. Cl. .......................................... A01j 25/06
[50] Field of Search ............................ 31/48, 46;
 146/123, 130; 56/294

[56] References Cited
 UNITED STATES PATENTS
 712,187 10/1902 Frazer ......................... 31/48
 971,506 9/1910 Junker ......................... 31/48
 1,240,261 9/1917 Sander ......................... 146/123
 1,441,073 1/1923 English, Jr. ..................... 56/294
 2,690,011 9/1954 Schulze ......................... 31/48

Primary Examiner—Hugh R. Chamblee
Attorney—Andrus, Sceales, Starke & Sawall

ABSTRACT: A curd mill for milling slabs of cheese curd. The curd mill includes a hopper to receive the curd to be milled, and two sets of intermeshing cutting discs are mounted for rotation within the hopper and serve to slice the curd. Located beneath the cutting discs is a reel having a series of generally herringbone-shaped blades which act to transversely cut the sliced curd into cubelike pieces.

The curd mill is mounted on a support so that the upper, open end of the hopper is at an angle of about 10° to 20° to the horizontal and in addition, the curd mill is positioned at an angle of about 10° to 20° with the sidewall of the cheese making vat. With this angular disposition of the curd mill, the milled curd is discharged outwardly toward the center of the vat.

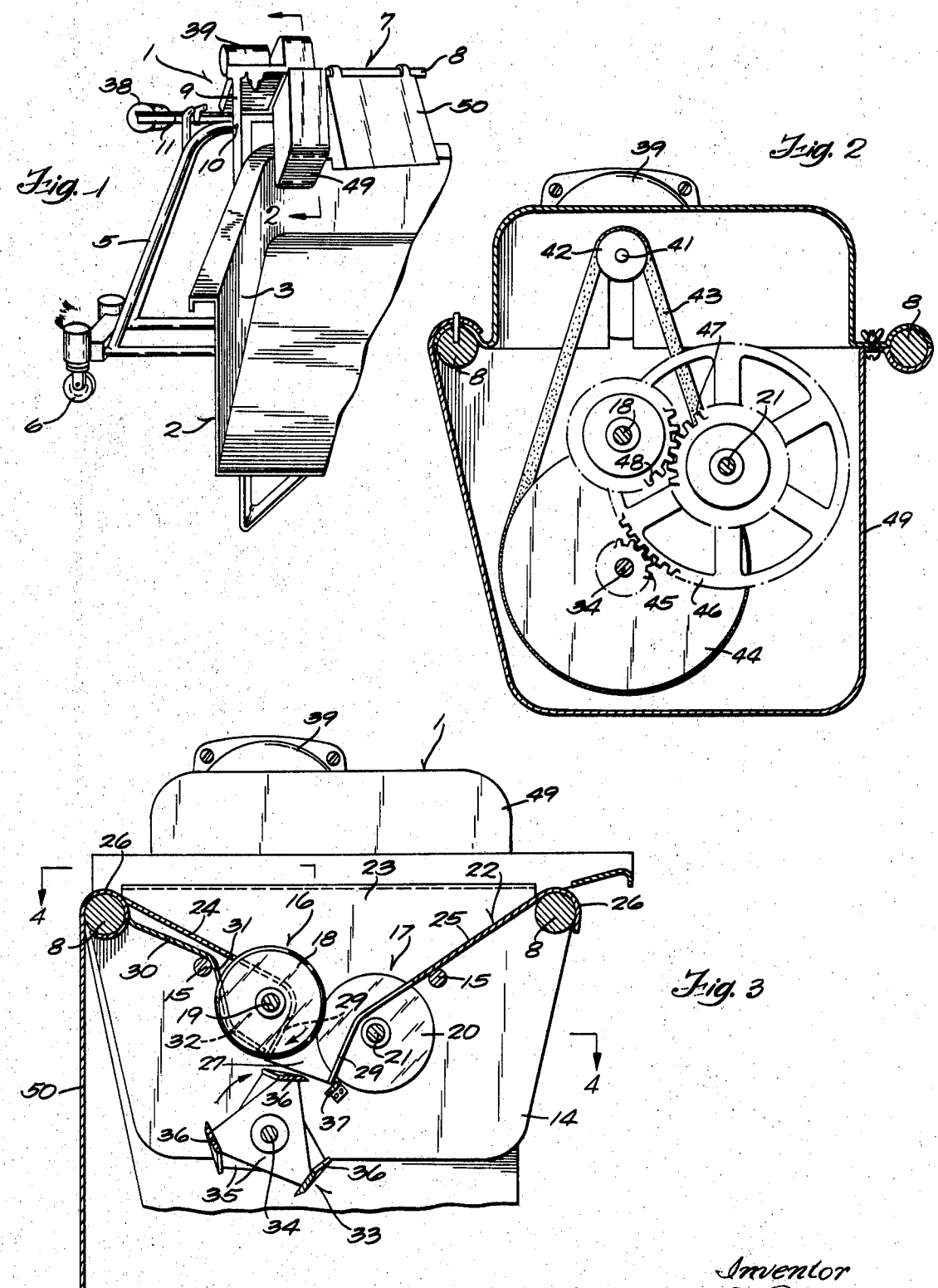

PATENTED MAR 23 1971

Inventor
Norman J. Peters
By Evans, Scales, Stark & Sawall
Attorneys

CURD MILL

The present invention is directed to a curd mill and more particularly to an improvement to the curd mill shown in U.S. Pat. No. 2,690,011 of W. J. Schulze.

A curd mill is used in conjunction with a cheese making vat to cut or mill the slabs of curd into small cubelike pieces. The standard curd mill, such as that shown in U.S. Pat. No. 2,690,011, includes a hopper to receive the curd slab to be milled and intermeshing sets of horizontally spaced cutting discs are located within the lower end of the hopper and serve to slice the curd longitudinally. Located beneath the cutting discs is a reel which serves to cut the sliced curd transversely into a series of small cubelike pieces.

There has been a tendency with curd mills used in the past for portions of the curd to become lodged between the cutting discs and the sidewall of the hopper with the result that the discs rotating against the curd lodged in these areas tends to discolor the curd and turn it grey in color. While the grey color in no way effects the value of the curd, it does detract from its appearance.

The present invention is directed to an improvement to the curd mill shown in U.S. Pat. No. 2,690,011 and includes an open top hopper having end walls and opposed sidewalls which define a throat. Each of the sidewalls is provided with a series of slits and the slits in each sidewall receives a set of cutting discs which act to slice the curd as the curd slab is moved downwardly into the throat of the hopper. The portions of the sidewalls between adjacent slits serve as stripping fingers and as the end walls of the hopper extend to the lower ends of the stripper fingers, the hopper has improved strength and rigidity which improves the stripping action of the curd from the cutting discs.

Located beneath the throat of the hopper is a reel which acts to cut the sliced curd transversely into a series of small cubes. The reel includes a series of generally herringbone-shaped blades and the herringbone or V-shape of the blades tends to work the milled curd inwardly toward the longitudinal center of the reel and prevents the curd from lodging between the reel bearings and the sidewalls of the hopper.

As a further feature, the curd mill is tilted so that the upper inlet end of the hopper is disposed at an angle of about 10° to 20° from the horizontal. In addition, the curd mill is also disposed at an angle to the sidewall of the cheese making vat and with this angular disposition the milled curd being discharged from the reel is directed toward the center of the vat to a position where it can be more effectively stirred by the forking paddles in the vat. The tilting of the curd mill acts to lower the feeding end of the hopper so that the curd slabs can be more easily introduced into the hopper and also acts to lift the discharge side of the mill so that the pile of milled curd will not be contacted by the reel. If the milled curd, after falling to the bottom of the vat, piles up to a position where it is contacted by the reel it would undergo additional cutting which would reduce its particle size to an undesirable degree.

Other objects and advantages will appear in the course of the following description.

The drawings illustrate the best mode presently contemplated of carrying out the invention.

In the drawings:

FIG. 1 is a fragmentary perspective view of the curd mill of the invention as associated with a cheese making vat;

FIG. 2 is a vertical section taken along line 2—2 of FIG. 1;

FIG. 3 is a transverse section taken through the hopper of the curd mill;

Figure 4:
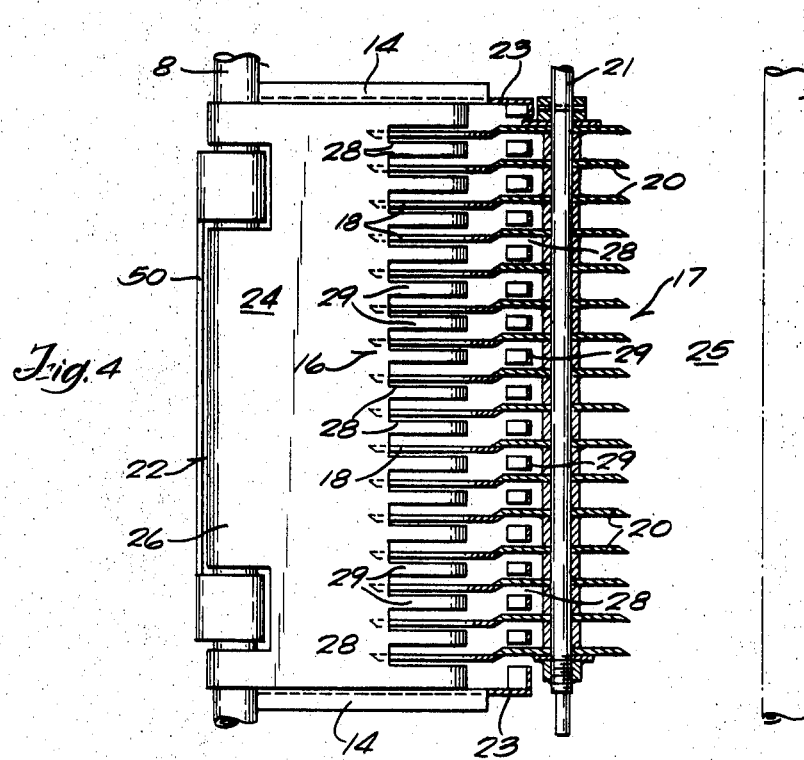
FIG. 4 is a section taken along line 4—4 of FIG. 3.

FIG. 1 illustrates a curd mill 1 as associated with an open top cheese making vat 2. The vat 2 includes a sidewall 3 and a bottom wall 4 and the slabs of cheese curd, not shown, are adapted to be manually removed from the bottom of the vat and introduced into the curd mill, which acts to mill or cut the curd into small cube-shaped pieces.

The curd mill 1 includes a portable support 5 mounted on wheels 6 so that the curd mill can be moved along the length of the vat. The curd mill also includes a frame 7 which is pivotally connected to support 5 and, during the milling operation, extends inwardly over the sidewall 3 of the vat 2. Frame 7 comprises a pair of support bars 8 and the inner ends of the bars 8 are provided with downwardly extending brackets 9. The lower ends of the brackets 9 carry shafts 10 which are journaled within openings in the support 5 so that the frame 7 can be pivoted or tilted with respect to the support 5.

Figure 6:
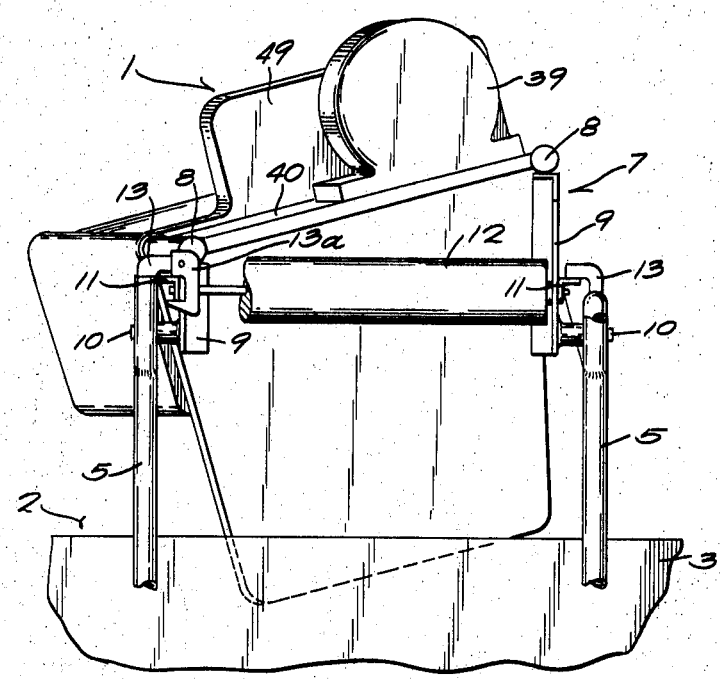
FIG. 6 is a rear end view of the curd mill as associated with a cheese making vat.

As best shown in FIG. 6, the brackets 9 are provided with different lengths so that the plane which extends through the support bars 8 is located at an angle of about 10° to 20° with respect to the horizontal and preferably about 15° with respect to the horizontal.

A pair of arms 11 extend rearwardly from the brackets 9 and the ends of the arms are connected by a counterweight 12 which acts to bias the frame 7, which carries the curd milling mechanism upwardly to an inoperative position so that the mill can be readily introduced and withdrawn from the vat 2. To retain frame 7 in the horizontal or operative position a pair of hooks 13 extend upwardly from frame 7 and a latch 13a is pivotally connected to one of the hooks 13. Hooks 13 engage arms 11 and serve as stops to limit the downward pivotal movement of the frame 7, while engagement of latch 13a with the under surface of arms 11 prevents the upward pivotal movement of frame 7. By pivoting the latch 13a inwardly the frame 7 will then be pivoted upwardly by the counterweight 12 to move the milling mechanism to an elevated inclined position.

The mill includes a pair of spaced walls 14 which extend transversely of the support bars 8 and are connected along their upper extremities to the support bars. Walls 14 are connected together by a series of rods 15 which extend generally parallel to the support bars 8, and a pair of intermeshing cutter disc assemblies 16 and 17 are mounted for rotation between the walls 14. The disc assembly 16 includes as series of horizontally spaced, cutting discs 18 which are mounted on shaft 19 journaled in walls 14. Similarly, the disc assembly 17 includes a series of horizontally spaced discs 20 which are intermeshed with discs 18 and are carried by shaft 21 journaled within the walls 14. As best shown in FIG. 4 the discs 18 of assembly 16 have their outer edges beveled in one direction, while the discs of the other assembly 17 have their outer edges beveled in the opposite direction so that in the assembled position the outer peripheral edges overlap with their flat sides in abutting relation. The intermeshing discs cooperate to cut the curd slab longitudinally into long strings or shreds.

The curd is introduced to the intermeshing cutter disc assemblies 16 and 17 by a hopper 22 which is mounted on the support bars 8 between walls 14. As shown in FIGS. 3 and 4, the hopper includes a pair of opposed end walls 23 and a pair of opposed sidewalls 24 and 25 which are connected along their side edges to end walls 23. The upper edges 26 of sidewalls 24 and 25 are curved and are supported on the support bars 8.

As best shown in FIG. 3, the lower ends of sidewalls 24 and 25 converge and define a throat 27. The lower portions of sidewalls 24 and 25 are each provided with a series of slots 28 and the discs 18 of cutter disc assembly 16 rotate within the slots of sidewall 24 while the discs 20 of assembly 17 are adapted to rotate within the slots 28 of the sidewall 25. The portions of the sidewalls located between the slots 28 serve as stripper fingers 29 to strip the curd from the rotating discs.

In addition, to the stripping action provided by the stripping fingers 29, a stripper wall 30 is connected between the end walls 23 and is located beneath the sidewall 24. The lower end of wall 30 is provided with a series of slots 31 which receive the discs 18. The portion of the wall 30 located between adjacent slots 31 define a series of stripper fingers 32 which act to strip any curd, that may be thrown upwardly from the cutting reel, from the discs 18.

Figure 5:
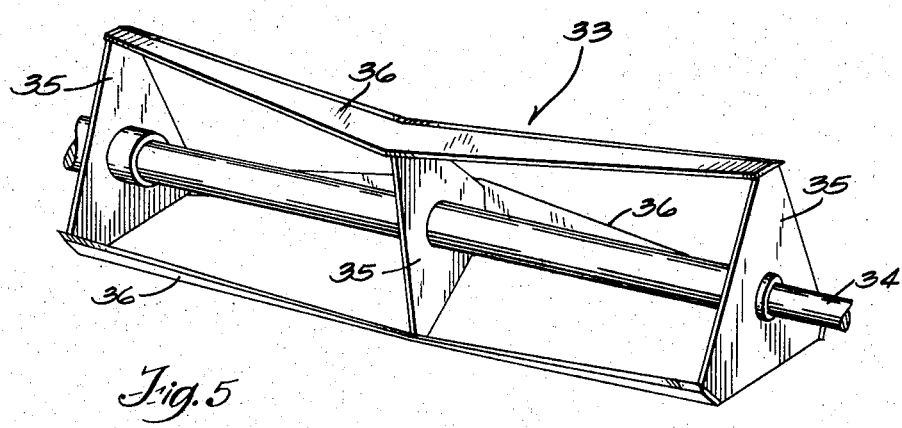
FIG. 5 is a perspective view of the reel.

The sliced curd is cut transversely into a multiplicity of cubes by a reel 33 which is located below the cutting disc assembly 16. As best shown in FIG. 5, the reel 33 includes a generally horizontal shaft 34 journaled in walls 14, and a series of generally triangular plates 35 are welded to the shaft. The tips or apices of the central plate 35 are displaced angularly with respect to the tips of the plates at the ends of the reel and blades 36 are connected across the flat tips of the plates. As shown in FIG. 5 the blades 36 have a generally V-shaped or herringbone configuration. Blades 36 act in conjunction with a fixed cutter bar 37 which extends across the hopper, to cut the sliced curd into a plurality of small cubelike pieces. The V-shaped or herringbone configuration of blades 36 aids in moving the curd toward the longitudinal center of the reel and thereby prevents the curd from lodging between the end plates 35 and the wall 14. As previously noted, curd lodged between the rotating surfaces tends to discolor and turn grey and this can detract from the overall appearance of the curd.

The cutter disc assemblies 16 and 17, as well as the reel 33 is driven by a motor 39 which is mounted on a platform 40 extending between the supports bars 8. The drive shaft 41 of motor 39, as shown in FIG. 2, carries a pulley 42 which is connected by a belt 43 to a large pulley 44 mounted on the shaft 34 of the reel. Shaft 34 also carries a gear 45 which meshes with a large gear 46 mounted on the shaft 21. In addition to gear 46, shaft 21 carries a gear 47 which engages a gear 48 on shaft 18 of cutter disc assembly 16. With this drive mechanism the motor 39 acts to rotate the reel 33 as well as the cutter disc assemblies 16 and 17 in the direction of the arrows as shown in FIG. 3. The drive mechanism is enclosed within a housing 49 which is supported by the bars 8.

As best shown in FIG. 6, the bars 8 are not located in a horizontal plane but instead the plane passing through the bars is disposed at an angle of 10° to 20° with respect to the horizontal. This inclined attitude lowers the feeding end of the hopper and also lifts the discharge side of the mill. Lowering the feeding end of the hopper has the advantage that the operator is not required to lift the curd slab as high as normal in order to feed it into the hopper, and lifting the discharge side of the mill elevates the reel 33 from the bottom 4 of the vat 2 so that the pile of milled curd will not be as apt to be contacted by the reel. If the milled pile of curd is contacted by the reel it will undergo additional cutting which is not desirable.

To prevent the curd from being thrown out of the vat a shield or guard 50 can be attached to the bars 8 and functions to direct the curd downwardly towards the bottom of the vat.

Figure 7:
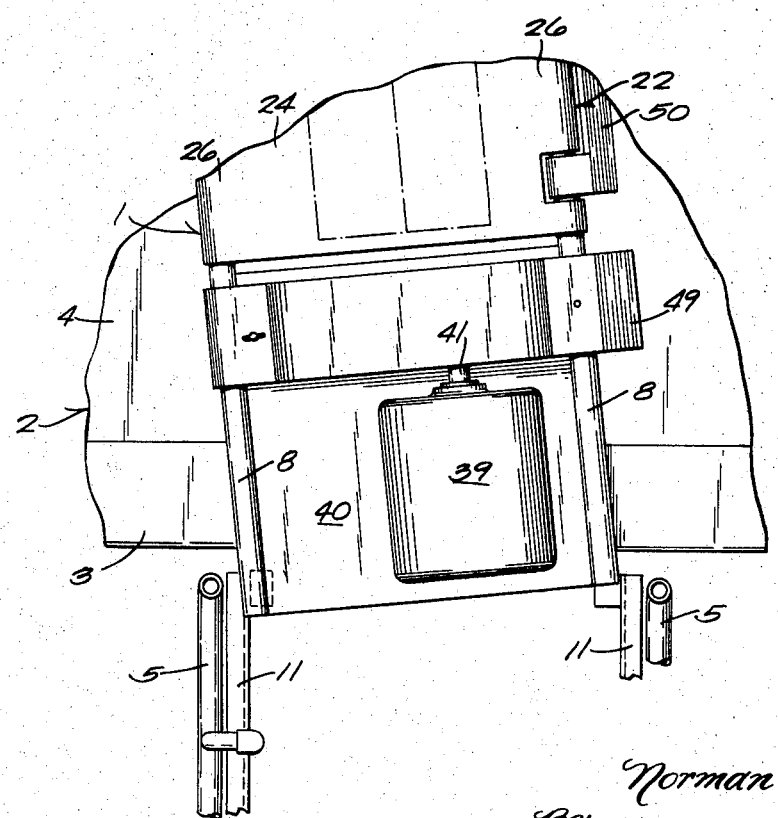
FIG. 7 is a fragmentary plan view of the curd mill as associated with the vat.

As an additional feature, the bars 8 and the hopper supported by the bars are disposed at an angle of about 10° to 20° with respect to the sidewall 3 of the vat, as best shown in FIG. 7. This angular disposition of the curd mill aids in directing the milled curd outwardly toward the center of the vat to a position where the milled curd can be more effectively stirred by the forking paddles.

Various modes of carrying out the invention are contemplated as being within the scope of the following claims particularly pointing out and distinctly claiming the subject matter which is regarded as the invention.

I claim:

1. In a curd mill, a frame, a hopper supported on the frame and adapted to receive cheese curd to be milled, slicing means mounted on the frame and located within the hopper for slicing the curd into strips, and a cutting reel operably associated with said slicing means for transversely cutting the sliced curd into a plurality of cubelike pieces, said reel including a plurality of blades extending longitudinally of the reel, the ends of each blade being advanced with respect to the longitudinal center of the blade to work the cut curd toward the longitudinal center of the reel.

2. The curd mill of claim 1, and including a fixed cutting bar mounted on the frame and disposed to cooperate with the blades of the reel to cut the sliced curd.

3. The curd mill of claim 1, and including an open top vat having a generally vertical sidewall and a bottom wall, said hopper being spaced above the bottom wall of the vat and the axes of the sets of cutting discs being located at an angle of 10° to 20° with respect to a plane passing through the sidewall of the vat.

4. The curd mill of claim 3, wherein said frame includes a pair of spaced generally parallel support bars extending generally laterally of the sidewall of the vat and said hopper is mounted on said support bars, a plane passing through said support bars is disposed at an acute angle to the bottom of the vat.

5. The curd mill of claim 4, wherein the cutting means includes a reel arranged to discharge the cut curd in a direction toward the higher of the pair of support bars.

6. The curd mill of claim 5, and including a shield attached to said higher of the pair of support bars and extending downwardly toward the bottom wall of the vat.

7. The curd mill of claim 1, wherein said frame includes a pair of spaced generally parallel support members and said hopper is mounted between said support members, a plane passing through said support members is disposed at an acute angle to the horizontal.

8. The curd mill of claim 7, wherein said acute angle is in the range of 10° to 20°.

9. In a curd mill, a frame, a hopper mounted on the frame and including a pair of opposed end walls and a pair of opposed sidewalls with the space between the sidewalls defining a throat, the portions of said sidewalls bordering said throat being provided with a series of slits defining depending stripper fingers, said end walls extending downwardly to the lower extremity of said fingers, a first set of horizontally spaced cutting discs disposed to rotate within the slits of a first of said sidewalls, a second set of horizontally spaced cutting discs disposed to rotate within the slits of the second of said sidewalls and intermeshed with said first set of cutting discs, said first and second sets of cutting discs disposed to cooperate to slice the curd into strips, cutting means located beneath said throat for cutting the sliced curd transversely into a plurality of cubelike pieces and including a plurality of rotatable cutting blades, drive means for operating said first and second sets of cutting blades, drive means for operating said first and second sets of cutting discs and said cutting means, and a stripper member located in spaced relation beneath said first sidewall and having a series of slits defining a series of stripper finger, the stripper fingers of said stripper member being disposed in alignment with the stripper fingers of said first sidewall and the first set of cutting discs disposed to rotate within the slits of said stripper member, the stripper fingers of said stripper member being located above the path of rotation of said cutting blades.

10. The curd mill of claim 9, wherein the stripper fingers of said stripper member are located on the opposite side of the axis of said first series of cutting discs from the stripper fingers of said first sidewall.